Sept. 25, 1928.
E. E. EMONS
SPECTACLES
Original Filed Sept. 17, 1925
1,685,192
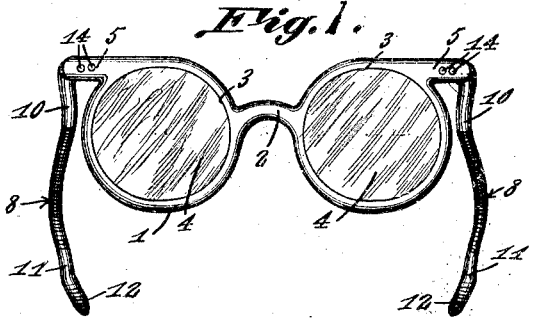
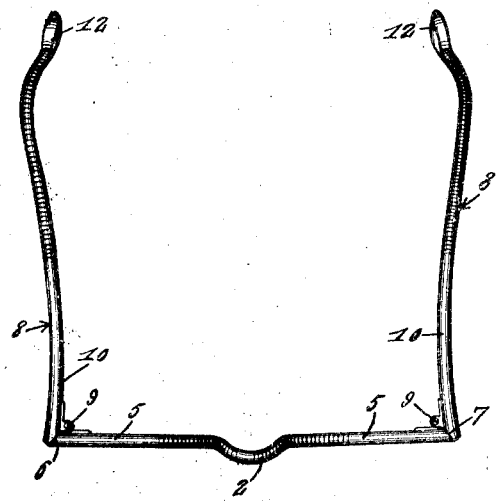
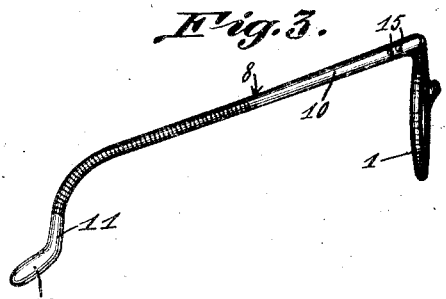
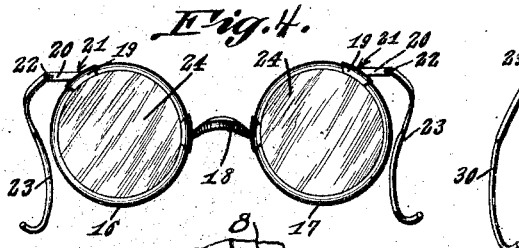
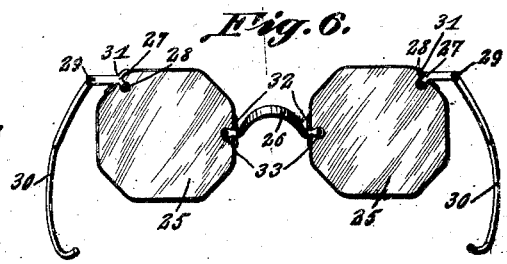
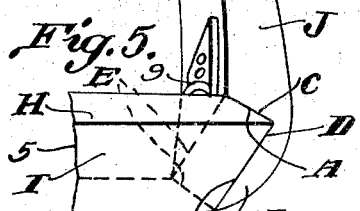
Ernest E. Emons, INVENTOR.
BY
Geo. P. Kimmel.
ATTORNEY.

Patented Sept. 25, 1928.

1,685,192

UNITED STATES PATENT OFFICE.

ERNEST E. EMONS, OF AKRON, OHIO, ASSIGNOR OF ONE-HALF TO ROBERT E. HILLIER, OF AKRON, OHIO.

SPECTACLES.

Application filed September 17, 1925, Serial No. 56,957. Renewed March 3, 1927.

This invention relates to spectacles, and has for its object to provide an article of such class, in a manner as hereinafter set forth, with means for not only reducing the obstructed field of vision to a minimum, but also to prevent the nose bridge of the spectacles from riding downwardly on the nose to maintain the lenses in the position to which they have been initially set.

In spectacles now in general use, the temporal attachment is connected 180 meridian of the lenses and these latter at right angles with respect to the attachment. The positions of the attachment and lenses relative to each other not only have been an obstruction to lateral vision, but further the nose bridge would shift downwardly on the nose to change the positions of the lenses after initially set, and to overcome such objections is the primary object of the invention, and to this end the invention consists in the elevating of the point of connection of the attachment with the lens frame or lenses, so that the temporal attachment is removed from a direct useful field of vision, thereby permitting of a clear and unobstructed view of objects, which when otherwise obstructed, have a direct tendency to endanger human lives, and the invention further consists in positioning the lens frame or lenses at an obtuse angle with respect to the forward ends of the temporal attachment, whereby the lens frame or lenses will act to prevent the nose bridge from riding downwardly on the nose, under such conditions maintaining the lenses in the position to which they have been initially set.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a front elevation of a pair of spectacles, in accordance with this invention.

Figure 2 is a top plan view thereof.

Figure 3 is a side elevation.

Figure 4 is a front elevation of a modified form.

Figure 5 is a fragmentary view, in perspective, looking towards the outer side of the hinged and bevelled joint between an end piece and a temple bar and illustrating also in dotted lines the coacting bevelled surfaces and in full lines the angles formed by the bevels.

Figure 6 is a front elevation of a further modified form.

Referring to Figures 1 to 3 of the drawings, the front of the spectacles consists of a heavy shell frame 1 formed of zylonite, fiberloid or other suitable material capable of resiliency and stretching under the application of heat, and the said frame 1 includes a nose bridge 2 and a pair of openings 3, and in each of the latter is mounted a lens 4. Each end of the frame 1, at the top thereof, is formed with a laterally extending tangentially disposed protuberance 5, and said protuberance 5 is termed an end piece or point of attachment. The outer end of each end piece 5 is bevelled, as at 6, and adapted to abut against the bevelled end surface 6 of each end piece 5 is the bevelled end surface 7 of a temple bar 8. The temple bars 8 are connected to the end pieces 5 by hinges 9. The bevelled end surfaces 6 and 7 extend throughout rearwardly at an inclination from the tops thereof. The bevelled surfaces 6 are adapted to abut the bevelled surfaces 7 when the spectacles are worn whereby the frame 1 will be disposed at an acute angle with respect to the forward ends of the bars 8, as clearly shown in Figure 3, and this manner of positioning the frame 1 with respect to the bars 8 will prevent the nose bridge from riding downwardly on the nose so that the initial position of the lenses with respect to the eyes will be maintained.

Each of the temple bars 8 comprises an upper portion 10, a depending rearwardly extending intermediate portion 11, and a downwardly inclined rear portion 12. The upper portion 10 is of greater length than either of the portions 11 and 12 and is slightly curved in the direction of its length so that it will extend, intermediate its ends, towards the head of the wearer. It will be stated, however, that the temple bar can be set up of any suitable contour.

The frame is applicable to receive any size or shape of lenses, as the material of the frame can be readily stretched to receive the lenses 4. The act of stretching will in no manner distort or move out of alignment the end pieces 5. It will be noted that the end pieces 5 are always symmetrical as they are based on straight lines instead of circles.

The hinges 9 are secured to the end pieces 5 by the hold-fast devices 14 and to the temple bars 8 by the hold-fast devices 15.

Referring to Figure 5, the angles formed by the bevel on the end piece 5 are shown in full lines and designated A, B. The angles formed by the bevel on the temple bar 8 are shown in full lines and designated C, D. The bevel faces on the opposed ends of an end piece and temple bar are indicated in dotted lines and designated E. The bevel on the temple bar is indicated in dotted lines and designated E. The bevel on the temple bar 8 extends rearwardly at an inclination from the top thereof and the bevel on the end piece projects outwardly at an inclination from the top thereof. The bevels also extend transversely of the end piece and temple bar. In Figure 5, the upper face of the end piece is indicated at H and the front side face at I. The upper face of the temple bar is designated J and the outer side face thereof at K. The hinge connection is designated 9.

Referring to Figure 4, the front of the spectacles is formed from a frame constructed of light shell material and which includes a pair of rims 16, 17, connected together by a nose piece 18. Secured to each of the rims, at the top thereof, is a laterally extending tangentially disposed end piece comprising an inner clamping portion 19 and an outwardly extending short protuberance 20 disposed tangentially with respect to the rim. The end piece or point of attachment, shown in Figure 4, and which is referred to generally by the reference character 21, is symmetrical and based on straight lines instead of circles. Pivotally connected, as at 22, to the outer end of the arm 20, is a temple bar 23, and the point of connection between the arms 20 and bars 23 is such as to maintain the lenses at an acute angle with respect to the temple bars. Each rim can be stretched for any requirement, to conform to the shape of the lens 24.

Referring to Figure 6 of the drawings, it illustrates a pair of rimless spectacles complete, and the lenses thereof are indicated at 25, and each of which is shown, by way of example, as of polygonal contour. The lenses 25 are coupled together by a nose bridge 26. Connected to each lens 25, at the top thereof, as well as extending laterally therefrom is a tangentially disposed end piece or point of attachment 27. Holdfast devices 28 are employed for securing the inner end of the end piece 27 to the lens 25, and the outer end of the end piece 27 is pivotally connected, as at 29, to a temple bar 30 and the connections between the end pieces 27 and temple bars 30 are such as to provide for the lenses to be disposed at an obtuse angle with respect to the forward end of the temple bars 30. Bearing strips 31 are interposed between the end pieces 27 and the edges of the lenses 25, and bearing strips 32 are interposed between the nose bridge and the lenses 25. The bridge 26 is secured to the lenses 25 by the holdfast devices 33.

The inner end of each protuberance, end piece or point of attachment, of the various forms shown, is disposed at a meridian at an oblique angle to the horizontal with respect to a lens. This arrangement permanently maintains the lenses in a predetermined fixed position, as well as prevents any tilting thereof and further acts to arrest the moving forward of lenses with less tension on the ears when the spectacles are worn.

The setting up of a pair of spectacles, in a manner as stated, provides an end piece or point of attachment either in the material of the frame or the lens itself that reduces the obstructed field of vision to a minimum. The usual decentration of the lenses is eliminated by the use of an end piece or point of attachment, in accordance with this invention. The end piece or point of attachment permits of greater range of adjustments, due to the fact that the temple is on a horizontal plane with the brow and top of the ear as the dimension of the head is more uniform at the position of the end piece or point of attachment than where the temple runs over the cheek bones as is usually the case in the form of spectacles now used. The end piece or point of attachment, in accordance with this invention will in addition permit of a greater number of people being fitted and benefited by glasses who heretofore, due to irregular facial contour, could not be supplied. Furthermore, the position of the end piece or point of attachment with respect to the lenses elevates the temporal attachment above the position now generally employed, which is at the 180th meridian of the lenses, and by elevating the end piece or point of attachment, it is removed from a direct useful field of vision, thereby permitting of a clear, unobstructed view of objects. The setting up of the spectacles with the end piece or point of attachment, in accordance with this invention, necessitates no noticeable increase in the cost of manufacture, thereby not limiting its usages or advantages to any one, at the same time it possesses more attractive and useful advantages.

As hereinbefore stated, the positioning of the frame or the lenses at an acute angle with respect to the temple bars prevents the nose bridge from riding downwardly on the nose, under such conditions maintaining the lenses in the position in which they have been initially set to obtain proper vision at all times.

It is thought the many advantages derived from a pair of spectacles, constructed in accordance with this invention, can be readily understood, and although the preferred embodiments of the invention are as illustrated and described, yet it is to be understood that changes in the details of construction can be had which will fall within the scope of the invention as claimed.

What I claim is:—

1. In a pair of spectacles, a front, a pair of end pieces carried by and projecting therefrom at each end thereof, and a pair of temple bars hinged to said end pieces, the axes of the hinges between the bars and end pieces being inclined with respect to the plane of the front, said bars and end pieces having like bevelled surfaces and with the bevel of each surface extending throughout rearwardly at an inclination from its top, the bevelled surfaces of the end pieces adapted to abut the bevelled surfaces of said bars and in connection with the axes of the hinges disposing the front at an acute angle with respect to the bars when these latter extend rearwardly at right angles with respect to the front to prevent the latter from riding downwardly on the nose when set thereon.

2. In a pair of spectacles, a front, a pair of end pieces projecting tangentially in opposite directions therefrom, each of said end pieces having its inner end merging into the top and of a length to project an appropriate distance from an end of said front, and a pair of temple bars hinged to said end pieces and positioned by these latter at points removed from a direct useful field of vision, the axes of the hinges between the bars and end pieces being inclined with respect to the plane of the front, said bars and end pieces having like bevelled surfaces and with the bevel of each surface extending throughout rearwardly at an inclination, the bevelled surfaces of the end pieces adapted to abut the bevelled surfaces of said bars and in connection with the axes of the hinges disposing the front at an acute angle with respect to the bars when these latter extend rearwardly at right angles with respect to the front to prevent the latter from riding down when set upon a wearer's head.

3. In a pair of spectacles, a bridge piece for connecting the lenses together, temple bars, oppositely extending lateral end pieces disposed at a meridian oblique to the horizontal meridian with respect to the lenses to permanently fix the position of said lenses, said end pieces extending in the plane of the lenses and providing a pair of supporting points, said end pieces located completely out of the useful field of vision, and hinged means between the outermost ends of said end pieces and forward ends of the temple bars to maintain said fixed position of the lenses with respect to the temple bars, the axes of the hinge means being inclined with respect to the plane of the lenses.

4. In a pair of spectacles, oppositely extending lateral end pieces disposed at a meridian oblique to the horizontal meridian with respect to the lenses to permanently fix the position of said lenses, said end pieces being located completely out of the useful field of vision and extending in the plane of the lenses, and stationary hinged means for connecting the outermost ends of said end pieces to the forward ends of temple bars and having the axes thereof inclined with respect to the plane of the lenses.

5. A spectacle frame, comprising temple lugs the rear faces of which occupy a plane which is inclined from the rear toward the front face of the lens holding frame, temple bars, and hinges, one wing of each of which is connected to the front end of the temple bar and the other wing of which is connected to the said rear faces upon the said temple lugs.

In testimony whereof, I affix my signature hereto.

ERNEST E. EMONS.